(12) United States Patent
Shen

(10) Patent No.: US 6,504,313 B1
(45) Date of Patent: Jan. 7, 2003

(54) IGNITION SCHEME FOR ELECTRONIC HID BALLAST

(75) Inventor: Eric Shen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 25 days.

(21) Appl. No.: 09/687,136

(22) Filed: Oct. 13, 2000

(51) Int. Cl.[7] .............................................. H05B 37/02
(52) U.S. Cl. ............................... 315/209 CD; 315/291; 315/209 R; 315/225
(58) Field of Search ................................. 315/307, 291, 315/209 R, 224, 225, 209 CD, 209 M, DIG. 5, DIG. 2

(56) References Cited

U.S. PATENT DOCUMENTS

| | | | | |
|---|---|---|---|---|
| 4,415,837 A | * | 11/1983 | Sodini | 315/177 |
| 5,844,380 A | * | 12/1998 | Siepkes | 315/307 |
| 6,057,651 A | * | 5/2000 | Usami | 315/291 |
| 6,184,635 B1 | * | 2/2001 | Boenigk | 315/291 |
| 6,323,603 B1 | * | 11/2001 | Persson | 315/290 |

* cited by examiner

Primary Examiner—Don Wong
Assistant Examiner—Tuyet T. Vo

(57) ABSTRACT

An improved ignition circuit for a high intensity discharge (HID) lamp is disclosed. The ignition voltage is provided across a single capacitor, and at the end of the ignition phase, a second capacitor is switched into the circuit to divide the voltage across two capacitors, and provide a steady state square wave current and voltage.

23 Claims, 2 Drawing Sheets

IGNITION SCHEME FOR ELECTRONIC HID BALLAST

TECHNICAL FIELD

This invention relates to a method and apparatus for igniting a High Intensity Discharge (HID) lamp. The invention has particular application in high volume commercial HID devices, where cost is an important consideration.

BACKGROUND OF THE INVENTION

HID lamps typically use a gas sealed within a glass container which conducts electricity and emits light at a particular wavelength. The wavelength is a function of the type of gas used.

In order to start, or ignite, an HID lamp, there are generally four phases the ballast must account for. The first phase is the breakover phase, in which a relatively high voltage pulse (e.g., 3 kilovolts) is applied between two electrodes of the HID lamp in order to free electrons from the gas molecules and start the conduction process. Typically the ballast must supply the high voltage pulse for a duration of approximately 10 microseconds. After the 10 microsecond 3 kilovolt pulse, a takeover state is entered. Depending on the lamp and ballast conditions, the takeover state can last on the order of hundreds of microseconds, during which the ballast must be capable of supplying approximately 280 to 300 volts to the lamp. This continues the process of bringing the gas towards a steady state of conduction.

After takeover, the HID lamp enters the run up phase. At the beginning of the run up phase, the temperature, internal pressure, and voltage within the lamp are relatively low. During the run up phase, the voltage ramps up from approximately 20 volts to approximately 90 volts over the course of a minute or even more. After that minute, the lamp enters its fourth and final stage, which is the steady state operating phase. During steady state, the lamp emits light at its normal temperature and pressure for which it was designed.

During steady state, the lamp is operating based upon a current signal which must oscillate. More specifically, because of the physics of such devices, they cannot operate on DC but must instead be operated based upon preferably a low frequency square wave signal which oscillates between a positive and negative current. Thus, the steady state may be, for example, a square wave current at 100 Hz that results in a lamp voltage which oscillates between plus and minus 90 volts.

The above four phases require that the circuitry to drive the lamp deliver a prescribed signal. More specifically, the drive circuitry must deliver the breakover ignition pulse of approximately 10 microseconds, followed by the takeover voltage of approximately 280 to 300 volts for on the order of hundreds of microseconds, and then the run up and steady state voltages. FIG. 1 is an exemplary prior art arrangement for delivering the above-prescribed signal. At ignition, a signal of approximately 400 volts is placed across capacitor 150. The 400 volts is conveyed through device 130 and inductor 134, and causes a signal of approximately 300 volts to appear across capacitor 132.

Capacitor 132 causes igniter 105 to generate a pulse of approximately 3 kilovolts for approximately 10 microseconds, after which the igniter 105 appears essentially as a short circuit. The igniter is typically triggered by the voltage across capacitor 132 to generate the 3 kilovolt pulse. After the initial pulse, and when the igniter acts as an effective short circuit, the voltage of approximately 280 to 300 volts from capacitor 132 is delivered from capacitor 132 through igniter 105 to the HID lamp 108. These 280–300 volts are maintained for on the order of hundreds of microseconds, until the takeover phase is complete. Immediately after the takeover phase, controller 110 begins the run up and steady state process. During steady state, controller 110 controls the gate voltages of 136 through 139 such that the oscillating square wave described above is delivered to the lamp 108.

A problem with the arrangement of FIG. 1 is that the cost is relatively expensive due to the number of components. More specifically, because it is required to generate a square wave which varies its polarity periodically, four transistors are required within commutator 120. The four transistors act in conjunction with the control voltages applied to their gates by controller 110 in order to generate the required square wave.

FIG. 2 shows an alternative prior art embodiment for delivering the prescribed four phases of signal to an HID lamp. The arrangement of FIG. 2 utilizes two capacitors 220 and 222 in series as a voltage divider. HID lamp 108 is connected between igniter 105 and point 208. The system need not use four different transistors to create the square wave utilized during steady state. Instead, only two transistors 224 and 226 are needed. During steady state, lamp electrode 210 is connected to point 208, and transistors 224 and 226 can be operated at high frequency and at varying duty ratios. Thus, by operating controller 218 in a fashion such that transistors 224 and 226 are alternatively switched on and off with the proper durations, the required steady state current and voltage waveforms can be delivered. Since one of the HID lamp electrodes is connected to the middle of the divider formed by capacitors 220 and 222, only two transistors 224 and 226 are needed to generate a square wave with changing polarity.

The problem with the arrangement of FIG. 2 occurs during ignition. More specifically, in order to supply the approximately 280 volts needed to be present across the lamp 108 during takeover phase, 560 volts must be present between points 214 and 216. This increased voltage, which is used only during the initial ignition process, creates relatively high stress on the circuit components. This either causes failures or, in the case of quality components that can withstand the stress, drives up the cost to nearly the point of using the four devices in FIG. 1.

In view of the above, there exists a need in the art for an ignition circuit for an HID lamp which can utilize only a small number of switching devices but yet can operate without the relatively high voltages required in arrangements such as that in FIG. 2.

SUMMARY OF THE INVENTION

The above and other problems of the prior art are overcome in accordance with the teachings of the present invention which relates to an ignition circuit for HID lamps. A two-transistor circuit is utilized which is sufficient to provide the steady state square wave voltage of approximately 90 volts. During the ignition process, a switch is utilized to switch one of two capacitors forming a voltage divider out of the ignition circuit. This results in the entire input voltage being applied to one capacitor, thereby delivering a sufficient voltage for ignition. After the ignition period, the second capacitor is switched back into the circuit, thereby forming a voltage divider and permitting the pulsed steady state voltage to be delivered to the lamp.

DETAILED DESCRIPTION OF THE PREFERRED EMBODIMENT

Figure 3:
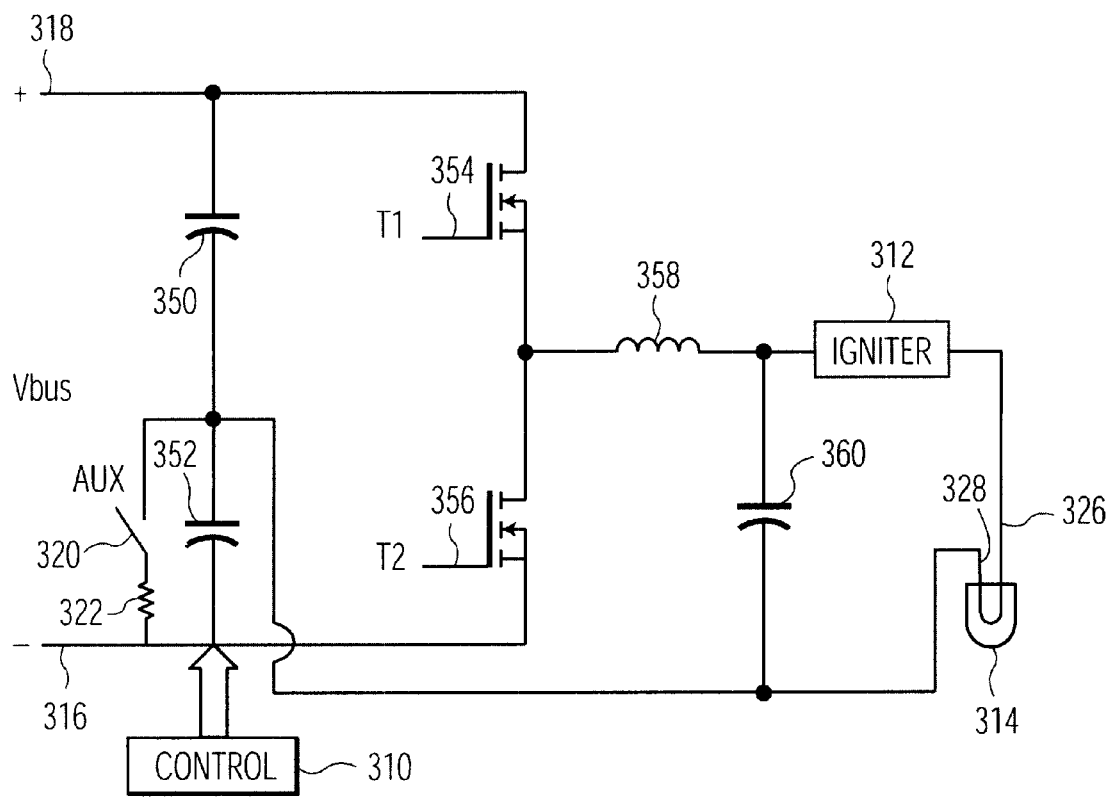
FIG. 3 depicts an exemplary embodiment of the present invention for use in the ignition of an HID device.

The arrangement of FIG. 3 includes two transistors 354 and 356, supply capacitors 350 and 352, capacitor 360, and control circuitry 310. As is conventional, an igniter 312 is connected to the HID lamp 314.

Although not shown for purposes of simplicity, the gates of transistors 354 and 356 are connected to controller 310, so that controller 310 may switch devices 354 and 356 on and off at the appropriate times as described hereafter. A switch 320 is placed across capacitor 352. The switch may be implemented in the form of a solid-state device such as a MOSFET or any other conveniently available switch. The switch may also be connected to controller 310 in order to facilitate control thereof. A resistor 322 is connected in series with the switch 320. Typical values of capacitors 350 and 352 range from 22 to 68 microfarads.

In operation, an initial bus voltage of approximately 400 volts is applied across terminals 318 and 316, and the switch 320 is kept closed by controller 310. This causes point 328 to be connected to terminal 316, and thereby places approximately the entire 400 volts across capacitor 350. Transistors 354 and 356 are operated at high frequency and at the proper duty ratios such that 280 to 300 volts are delivered across capacitor 360, triggering the igniter 312.

After the breakover and takeover periods, the system enters the run up phase and it is necessary to prepare the system for AC operation. Controller 310 monitors the status of the system, and after the lamp has entered the run up phase, places switch 320 into the open position. This may be accomplished for example, by removing an appropriate gate voltage from a MOSFET or similar device.

Figure 1:
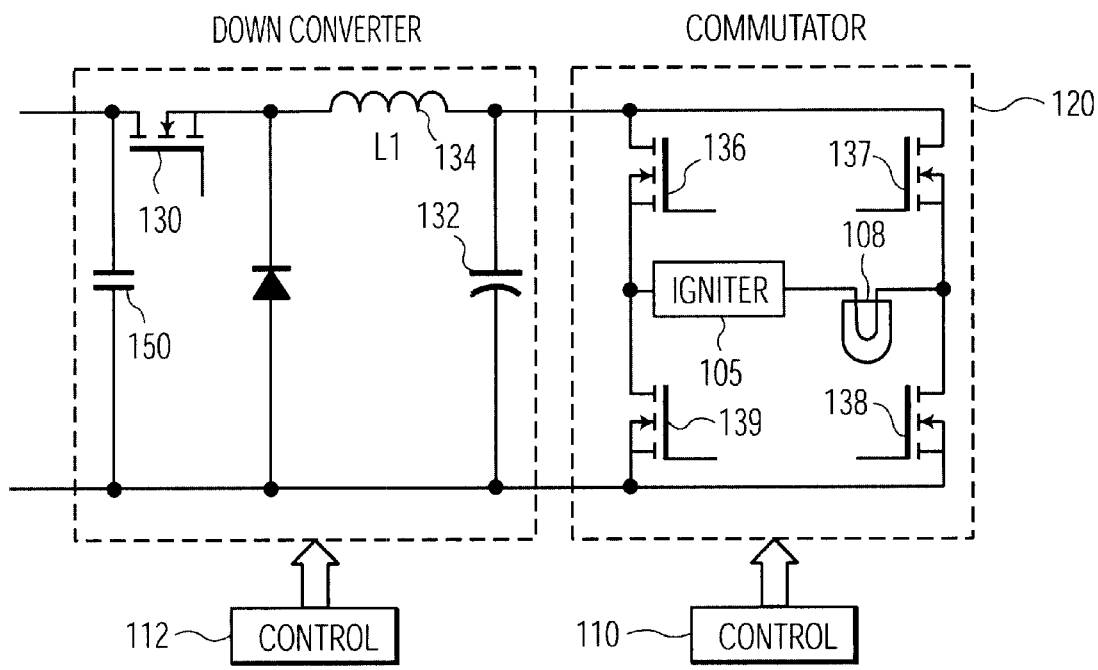
FIG. 1 depicts an exemplary prior art arrangement for use in igniting an HID device.
Figure 2:
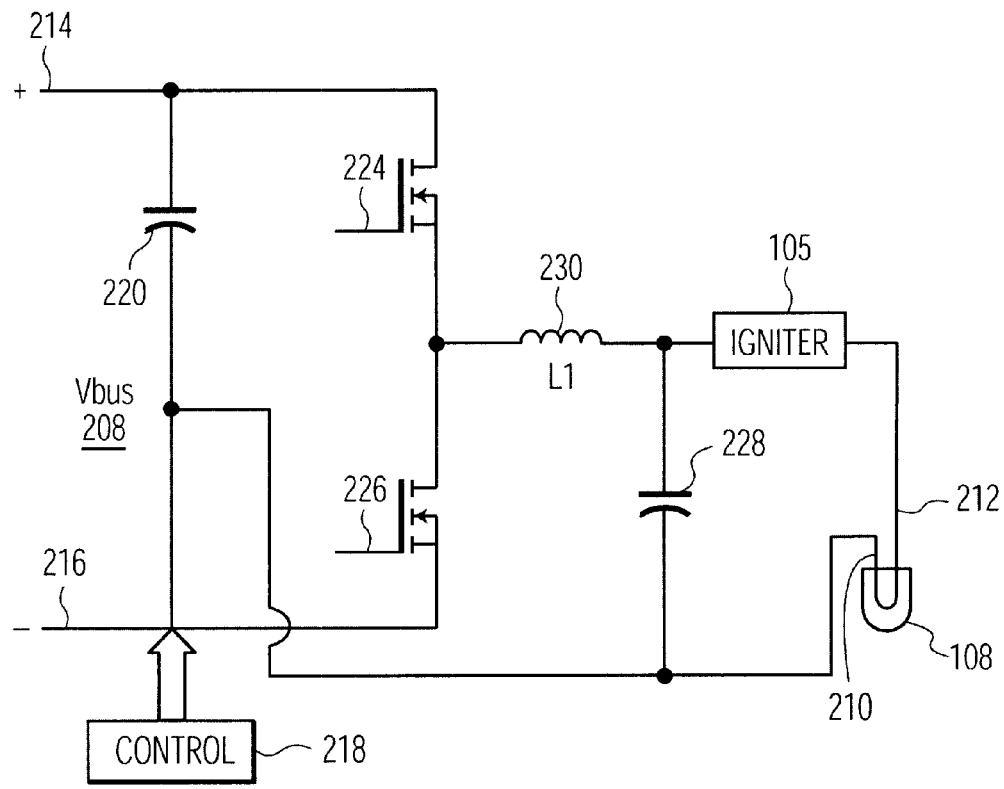
FIG. 2 depicts an alternative prior art arrangement for use in igniting an HID device.

By opening such a switch, the 400 volts across terminals 316 and 318 is now divided between capacitors 350 and 352. The circuit thus is in the arrangement shown in FIG. 2 for delivering steady state square wave current and voltage to the lamp 314 for operation. Thus, by utilizing two capacitors in series and switching one of the them out of the circuit for the breakover and takeover periods, the benefits of a reduced number of components are achieved without the expense of having to use high stress components to withstand increased voltages between terminals 316 and 318.

The transition from the ignition phase to steady state phase must be timed correctly. More specifically, we refer to the steady state phase as AC operation, since the signal driving the HID lamp is alternating polarity square wave. It is important that the controller sense the end of takeover and immediately open switch 320 in order to place capacitor 352 back into the circuit. There are several manners in which this can be accomplished. One is to have the controller monitor the impedance measured across the HID lamp 314. A drop in impedance occurs at the end of takeover, since the gas becomes more conductive.

Another technique is for the controller to measure the current being delivered to the HID lamp, since the end of takeover phase is marked by a sudden increase in the current being delivered to the lamp due to the lower impedance of the lamp.

Regardless of how the end of takeover is sensed, the controller 310 opens switch 320 upon sensing the end of takeover, and capacitor 352 then begins to charge naturally as capacitor 350 discharges. The total voltage between points 318 and 316 nonetheless remains substantially constant. When the voltage across each of capacitors 350 and 352 reaches approximately 200 volts, the controller 310 begins switching transistors 354 and 356 on and off appropriately to generate the steady state AC pulse signal required to drive the HID device.

By selecting capacitors 350 and 352 to have typical values on the order of 47 microfarads, the period of time it takes to charge 352 can be kept to under 100 milliseconds. This timing is important since by keeping the charge time small, the HID lamp 314 is not operating in a DC mode for an extended length of time, which could cause damage to the lamp.

If the lamp were to extinguish during operation while the power is still applied, then capacitor 352 should be discharged before re-ignition. The controller 310 will sense the extinguishing of the lamp and discharge capacitor 352 through switch 320 prior to the ignition. This discharge should be limited by the controller 310 in order to avoid massive currents destroying switch 320.

Such a discharge is accomplished by controller 310 switching an additional resistor 322 into the path between capacitor 352 and ground in order to limit the current in the capacitor discharge path. Alternatively, the controller can properly drive switch 320 in order to limit the current permitted therethrough by regulating the gate voltage in a conventional fashion to provide for the correct current in accordance with the device characteristics. Once capacitor 352 is discharged, controller 310 may then initiate the ignition sequence again by closing switch 320 and thus place the appropriate voltage across capacitor 350.

While the above describes the preferred embodiment of the invention, it is understood by those of skill in the art that various modifications and variations may be utilized. For example, separate power supplies may be utilized during the ignition phase and later during the steady state phase. The switch 320 may be implemented using a variety of switching devices. Such modifications are intended to be covered by the following claims.

What is claimed:

1. A circuit for igniting a discharge lamp comprising:
   a voltage divider for delivering a drive voltage for the discharge lamp; and
   means for switching a portion of the voltage divider into said circuit after a predetermined stage of an ignition phase of said discharge lamp.

2. The circuit of claim 1 wherein the predetermined stage is a takeover phase of the discharge lamp.

3. The circuit as claimed in claim 1 wherein said voltage divider comprises at least two capacitors serially connected to terminals of a DC supply voltage.

4. The circuit as claimed in claim 1 further comprising:
   first and second control switches coupled in a series circuit to first and second terminals for connection to a source of supply voltage and to said HID lamp, and
   an electronic controller for alternately driving the first and second control switches on and off independently of the supply voltage at said first and second terminals.

5. A circuit for igniting a discharge lamp comprising:
   a voltage divider for delivering a drive voltage; and
   means for switching a portion of the voltage divider into said circuit after a predetermined stage of an ignition phase of said discharge lamp, wherein the predetermined stage is a takeover phase of the discharge lamp and said voltage divider comprises at least two capacitors.

6. The circuit of claim 5 wherein said means for switching further comprises a device for monitoring a voltage or current delivered to said discharge lamp and for switching said portion of said voltage divider in response to said voltage or current.

7. A method of delivering electrical power to a High Intensity Discharge (HID) lamp, the method comprising the steps of:
    delivering an initial voltage sufficient to ignite the lamp by causing a lamp breakover phase to occur;
    maintaining said voltage long enough to provide for a lamp takeover phase; and
    dividing said voltage after said takeover phase of said HID lamp thereby to initiate a steady state phase of the HID lamp, and continuing to provide two steady state voltages to the HID lamp after said voltage division to drive said lamp in the steady state phase.

8. The method of claim 7 further comprising the step of monitoring the current delivered to the HID lamp in order to initiate the step of dividing the initial voltage.

9. The method of claim 8 wherein each of two steady state signals are delivered to a separate one of two switching devices, and wherein said two switching devices are alternately switched on and off.

10. The method of claim 7 further comprising the steps of:
    monitoring electrical parameters of said HID lamp during said steady state phase;
    determining, in response to said step of monitoring, whether said HID lamp has become extinguished during steady state operation thereof; and
    if so, causing a gradual increase in one of said two steady state voltages to increase it to a value equal to that of said initial voltage.

11. The method of claim 10 further comprising the step of igniting said lamp after said gradual increase to said equal value is complete.

12. The method of claim 11 wherein said gradual increase is accomplished by switching a discharge resistor in series with a capacitor.

13. A circuit for driving a High Intensity Discharge (HID) lamp comprising:
    a first capacitor connected between a first and second point, and a second capacitor connected between said second point and a third point,
    an igniter connected between said second point and a fourth point;
    a first switch connected between the first point and fourth point, and a second switch connected between the third point and fourth point;
    a third switch connected between the second point and third point; and
    a controller for igniting the HID lamp with the third switch closed, and for switching the third switch open when the HID lamp enters a run up phase.

14. The circuit of claim 13 wherein the controller alternately switches the first and second switches on and off during steady state operation in order to generate a substantially square wave from an input voltage.

15. The circuit of claim 13 wherein the controller includes means for ascertaining if the HID lamp becomes extinguished during operation, and if so, for causing a gradual discharge of said second capacitor.

16. The circuit of claim 15 wherein the third switch is a transistor and said gradual discharge is caused by driving a gate of said transistor in a manner sufficient to limit current through said transistor in a prescribed manner.

17. A circuit for driving an HID lamp comprising;
    means for delivering AC power from a power source to said HID lamp from a power supply;
    means for monitoring a characteristic of said HID lamp and in response delivering said power, and
    means controlled by the monitored characteristic of the HID lamp for switching a device into said circuit so as to implement a voltage divider.

18. The circuit of claim 17 wherein the predetermined characteristic is lamp current.

19. The circuit of claim 17 wherein the voltage divider is a capacitive voltage divider, the circuit further comprising a monitor for monitoring said HID lamp to determine if said HID lamp has extinguished during operation, and if so, gradually discharging a capacitor of the capacitive voltage divider.

20. The circuit as claimed in claim 17 wherein the voltage divider is a capacitive voltage divider comprising at least first and second capacitors, and the device switched into the circuit is the second capacitor.

21. The circuit as claimed in claim 20 wherein, during an initial stage of the ignition phase of the HID lamp the switching means effectively switches the second capacitor out of the circuit so that an ignition voltage for the HID lamp appears across the first capacitor, and during a run-up stage of the HID lamp ignition phase the switching means switches the second capacitor into the circuit so as to form said capacitive voltage divider, whereby the ignition voltage is divided across the first and second capacitors.

22. The circuit as claimed in claim 20 further comprising:
    means for coupling the first and second capacitors in a first series circuit to first and second input terminals for connection to a DC power supply,
    first and second controlled switches coupled in a second series circuit to said first and second input terminals and to said HID lamp so as to deliver said AC power to the HID lamp, and wherein
    the monitoring means comprises an electronic controller for alternately driving the first and second controlled switches on and off so that said switches supply an alternating polarity square wave drive voltage to the HID lamp.

23. The circuit as claimed in claim 20 further comprising:
    first and second controlled switches coupled in a series circuit to first and second terminals of the power supply and to said HID lamp so as to deliver said AC power to the HID lamp, wherein;
    the monitoring means comprises an electronic controller for alternately driving the first and second controlled switches on and off,
    the switching means is coupled across the second capacitor, and
    the electronic controller closes the switching means during the breakover and takeover stages of the ignition phase of the HID lamp and opens the switching means during the run-up stage of the ignition phase of the discharge lamp thereby to switch the second capacitor into the circuit to form said capacitive voltage divider.

* * * * *